(12) United States Patent
Hayball et al.

(10) Patent No.: US 6,356,627 B1
(45) Date of Patent: Mar. 12, 2002

(54) COMMUNICATION SYSTEM ARCHITECTURE, APPARATUS AND MANAGEMENT AND SIGNALLING METHOD THEREIN

(75) Inventors: Clive C Hayball, Sawbridgeworth (GB); Perry L Prozeniuk, Carleton Place (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/295,196

(22) Filed: Apr. 20, 1999

(30) Foreign Application Priority Data

Dec. 23, 1998 (GB) .............................. 9828582

(51) Int. Cl.[7] .......................................... H04M 15/00
(52) U.S. Cl. ............................. 379/112.01; 379/112.01; 379/112.05; 379/112.04; 379/126
(58) Field of Search ..................... 379/112.01, 112.06, 379/126, 115.01, 133, 134, 137, 219, 221.1, 223, 225, 112.05, 112.04; 370/487, 489, 490, 298, 395, 400, 352

(56) References Cited

U.S. PATENT DOCUMENTS

| | | | | |
|---|---|---|---|---|
| 6,011,548 A | * | 1/2000 | Thascker | 345/327 |
| 6,178,455 B1 | * | 1/2000 | Schutte et al. | 709/228 |
| 6,032,137 A | * | 2/2000 | Ballard | 705/75 |
| 6,034,678 A | * | 3/2000 | Hoarty et al. | 345/327 |
| 6,101,182 A | * | 8/2000 | Sistanizadeh et al. | 370/352 |
| 6,141,339 A | * | 10/2000 | Kaplan et al. | 370/352 |
| 6,157,378 A | * | 12/2000 | Bormann et al. | 345/329 |
| 6,249,523 B1 | * | 6/2001 | Hrastar et al. | 370/401 |
| 6,252,952 B1 | * | 6/2001 | Kung et al. | 379/114 |

* cited by examiner

Primary Examiner—Curtis Kuntz
Assistant Examiner—Rexford N Barnie
(74) Attorney, Agent, or Firm—Lee, Mann, Smith, McWilliams, Sweeney and Ohlson

(57) ABSTRACT

Constrained operation performance of exchanges (50) and switches (16, 216) of wireline communication systems (10) is mitigated and single entry point management of the system maintained through the provision of a distributed multi-service hub (MSH) sub-net (350) architecture in which individual MSHs (302–308) have hidden point codes (1001–1003). A signalling server (352) is able to translate an address of the MSH sub-net into a point code associated with an MSH entry point into the MSH sub-net, while dialled digit information pertaining to a service or party identifies a related MSH exit point from the MSH sub-net (350). A path can therefore be established, with the signalling server (352) further required to ensure that the hidden point code associated with the MSH exit point is translated back to the address of the MSH sub-net in onward routing of signalling messages to the dialled service or party.

An intermediate element manager $EM^2$ (312) isolates a management server OSS (54) from element managers (314–322) associated with the control of individual MSHs (302–310), with the intermediate $EM^2$ (312) therefore providing a single address point to the OSS (54) while itself appearing as an OSS to the element managers (314–322) of individual MSHs (302–310). Signalling and management functions can therefore be consolidated at the intermediate $EM^2$ (312) to increase efficiency and reduce overhead.

33 Claims, 4 Drawing Sheets

COMMUNICATION SYSTEM ARCHITECTURE, APPARATUS AND MANAGEMENT AND SIGNALLING METHOD THEREIN

BACKGROUND OF THE INVENTION

This invention relates, in general, to communication system architectures and is particularly, but not exclusively, applicable to an apparatus and method of signalling and management within an exchange environment. The present invention is more specifically directed towards integrating signalling and management in a sub-net of telephony exchanges interconnected through a broadband network such that the sub-net of exchange nodes appears as a single node from a perspective of other external exchanges and management systems. The underlying inventive principle is designed to support migration from existing narrowband telecommunication infrastructure into a broadband domain.

SUMMARY OF THE PRIOR ART

Telecommunication systems are presently undergoing a transition from first generation narrowband digital networks and future multi-media digital networks having broadband capabilities. This transition is necessarily required to support higher data rate communications, including video and Internet applications, that are presently being both considered and made available. Unfortunately, this transitional phase also presents system operators with several dilemmas, and also prejudices immediate implementation of such broadband systems. For example, until such a time when a free-standing broadband system becomes an accepted and freely available standard for all subscriber terminals (such as cellular telephones and data transmission devices), system operators are reticent to write-off their significant investments in current narrowband infrastructure technology. Indeed, such narrowband infrastructure technology already provides a rich set of services and service creation environments that would have to be re-implemented to be deployed in broadband networks.

Consequently, present-day narrowband systems must be adapted to accommodate both narrowband and broadband users; with this statement particularly relevant to call establishment and interworking procedures between these different forms of network.

For an effective migration between narrowband and broadband systems (for the transitional phase), system operators must particularly consider an interworking scenario when all subscribers connect to a narrowband network, but one or more intermediate broadband networks are used to relay information between these narrowband subscribers.

In more detail, telecommunication networks comprise nodes connected by communication resources (usually termed "links"), with a particular network technology characterised by the means of transmission of user and control information along these links and also by the routing and relaying functions embodied in the nodes. The term routing is used to describe the process of determining the path the information will take through the network, while relaying is the process of transferring information from one link to another, i.e. the information is merely passed, without alteration, from one channel resource to another.

In relation to an exemplary narrowband digital network, user and control information (or "data") is interleaved, using time division multiplexing (TDM), on a 52 kbit per second (kbps) pulse code modulated (PCM) bearer channel. Such bearer channels can each be framed to support four voice calls of 16 kbps, comprised from 13 kbps of sampled and encoded speech and 3 kbit/s of ancillary information, such as parity check and correction bits (and the like) and synchronisation information. Data is then relayed across a node by some form of synchronous TDM switching fabric, often of the 'time-space-time' type. Control information (e.g. call set up and tear down messages) logically follows the same path (although not always the same physical path) through the network as user information, and is terminated in each node for routing purposes. Routing is conventionally performed, in each node, on a 'hop-by-hop' basis using long lived routing tables, i.e. the node is sufficiently intelligent to determine an optimum route for the succeeding network connection.

Control information is regulated by a signalling scheme that is distinctive to the type of network employed. Particularly, public signalling systems are used between nodes of a public network and between public networks of different operators. Signalling System No. 7 is the only important example of a public signalling system. Access signalling systems are used between subscribers and edge nodes of public networks, e.g. between a radiotelephone and a base station subsystem (BSS). In fact, the most common digital access signalling schemes are Common Channel Signalling Systems, such as the Integrated Service Digital Network (ISDN) DSSS1 signalling schemes (and its predecessors) and Channel Associated Signalling schemes that are both derived from analog signalling. Private schemes are generally derived from access schemes but provide richer functionality within personal networks, such as within a secure private branch exchange (PBX).

Broadband digital networks are characterised in that user and control information is transmitted in fixed or variable length 'packets', with these packets prepended with headers that contain bearer channel identification. In contrast with narrowband systems, user information is relayed across a node via an asynchronous switching fabric that examines each packet in turn (using some kind of fairness algorithm) and directs it to the appropriate output link in response to the input link and bearer channel identification. Routing and control information transmission is, however, similar to that for the narrowband case, and differs only inasmuch as the signalling schemes are technology specific.

As a very brief summary of the general teaching underlying PCT/GB98/0245 (that provides for the interconnection of narrowband and broadband networks), a communication system has a broadband network and a plurality of narrowband exchanges each containing at least one communication device. The narrowband exchanges has differing signalling protocols to those of the broadband network. The narrowband exchanges are interconnected through the broadband network, and the communication system is arranged to establish a communication connection between a calling communication device in a first narrowband exchange and a receiving communication device in a different narrowband exchange. Each of the at least one communication devices has an address. Each of the plurality of narrowband exchanges comprises a call server responsive to a call request message generated by the calling communication device, wherein the call request message contains the address of the calling communication device and a destination address associated with the receiving communication device. The call server is arranged to identify a circuit identity associated with a first communication circuit used to send the call request message to the call server. The narrowband exchanges further include means for selecting a phantom trunk different to the first communication circuit, wherein the phantom trunk has a circuit identity and is arranged to support a narrowband communication between the first narrowband exchange and the different narrowband exchange over the broadband network. Each narrowband exchange further includes: means for sending, in a first message, the destination address and the circuit identity from the first narrowband exchange to the second narrowband exchange; means for sending, in a second message, the circuit identity and the address of the calling communication device to the second narrowband exchange; means for identifying the presence of the circuit identity in both the first message and the second message to establish that the communication connection is between the calling communication device and receiving communication device; and means for establishing the communication connection through the broadband network.

In operation, the call server in a first narrowband exchange, in response to a call from a first subscriber terminal to a second subscriber terminal in the different narrowband exchange, selects a phantom trunk between the two exchanges. The phantom trunk has a unique circuit identity, which circuit identity is used in a first instance to relay to the second (i.e. different) exchange an address of the second subscriber terminal. Then, in a second instance, the unique circuit identity is used to relay to the second exchange an address of the first subscriber terminal. By recognising that two connection requests have been received at opposite ends of the same phantom trunk, a processor in the second exchange is able to determine that a direct connection between the first and second subscriber terminals is required through the broadband network.

In relation to the interconnection of exchange-related infrastructure, such as switches and narrowband-broadband interworking devices (referred to as "multi-service platforms" or "MSPs"), whilst it is preferably to have a distributed system in which catastrophic system failure can be avoided by the re-routing of traffic through physically separate but equivalent functional entities (in addition to built-in redundancy provisions), system operators prefer to operate and manage a unitary system from both an operations perspective and a signalling perspective. The principal reason behind the requirement of a unitary system is that management and call handling is simplified, and adaptation of the system is relatively easy in that a change in configuration is achievable from a single entry point.

In view of development time, cost and complexity of exchange-related infrastructure, it is fundamentally essential that migration from existing narrowband systems to fully-fledged and independent broadband systems takes place, as previously indicated. In this regard, narrowband architectures such as the DMS™ exchange manufactured by Northern Telecom Limited, provide a foundation for mixed and, ultimately, solely broadband-based systems. In fact, the DMS™ exchange now provides a full set of call processing and routing features by virtue of its development over many years, with the DMS™ exchange supported by many millions of lines of program code.

Network operators are continually demanding higher performance from exchanges by virtue of generally increasing levels of traffic, both in terms of the number of calls/connections and the capacity (and hence the bandwidth) assigned to each call/connection. However, exchanges are already reaching their optimum size (in terms of processing capabilities). For example, a call server that invokes feature codes and also oversees the set-up of circuit-to-circuit (in a narrowband sense) and circuit-to-virtual path connections across a broadband interface only has a limited processing capability and can only support a limited number of peripheral entities and connections. Of course, the call server can be upgraded, but such up-grades are generally a temporary fix and require supplementary equipment that itself eventually presents access, interconnection, heating and encapsulation (in the sense of overall size) problems. Indeed, the call server of the DMS™ exchange has been undergone upgrades to what is now termed an XA-core™, but the processing capacity of the single XA-core™ is nevertheless restricted to supporting a finite number of peripherals, such as information servers and broadband routing devices. Such peripherals generally support additional traffic capacity.

In relation to present handling capacity, exchanges typically handle less than about one million busy hour call (BHCA) attempts, but network operators are already stipulating a requirement for systems that have a capability of handling five million BHCA (and more). There is clearly a vast discrepancy in these two figures, with the difference unfortunately not immediately reconcilable through existing system design.

Network operators are therefore clearly desirous of the development of communication systems that provide increased processing capabilities whilst presenting a uniform view and single-entry point with respect to both an operations perspective and a signalling perspective.

SUMMARY OF THE INVENTION

According to a first aspect of the present invention there is provided a communication system comprising: a plurality of multi-service hubs (MSH), each MSH comprising an exchange having at least one multi-service platform (MSP), the exchange and the at least one MSP managed by an element manager that co-ordinates management thereof; an operations and support system (OSS) providing a control interface to an operator of the communication system; and an intermediate element manager coupled to each element manager in each MSH, the intermediate element manager further coupled to the OSS and configured to intercept system management information passed between the OSS and each of the element managers such that the intermediate element manager provides a single address point to the OSS while also appearing to be an OSS to each element manager in each MSH.

In a second aspect of the present invention there is provided a method of managing a communication system comprising a plurality of multi-service hubs (MSH) each having an exchange with at least one multi-service platform (MSP), the exchange and the at least one MSP managed by an element manager that co-ordinates management thereof, the communication system further comprising an operations and support system (OSS) providing a control interface to an operator of the communication system and an intermediate element manager interconnecting each element manager in each MSH and the OSS, the method comprising the steps of: restricting a passage of system management information between the OSS and selected ones of the plurality of element managers to a path via the intermediate network manager, such that the intermediate element manager provides a single address point to the OSS while also appearing to be an OSS to each element manager in each MSH Preferably, the intermediate element manager comprises a memory containing a connection map, and the method further comprising the steps of: stripping-out system addressing incident to the intermediate element manager from the OSS; and routing system management information to individual MSHs through use of the connection map.

In the intermediate element manager, it is preferred that the method further include the step of consolidating information from each element manager in each MSH to the OSS, thereby to ensure that the OSS receives system management information from a single node only.

In a preferred embodiment, each of the plurality of MSHs contains an associated call server, and the method of consolidating acts to consolidate, onto a single flow, at least one of: log records from call servers and MSPs; and performance measures from the call servers and MSPs, said performance measures typically reflecting traffic flows and semi-permanent virtual channel set-up rates.

The step of consolidating may further include the step of identifying affected/failed system entities by at least one of name and location.

The intermediate element manager may also act to queue system management information; and re-package said system management information into blocks of related data.

Furthermore, the intermediate element manager, may act to strip-out superfluous data from messages communicated to it by the each of the element managers.

In another embodiment, the method further comprises the step of: at the intermediate element manager, merging billing streams emanating from each MSH (314–322) to produce a network billing record.

The method may also include the step, at the intermediate element manager, of correlating billing records from a plurality of call managers involved in a call across the communication system, thereby providing a single consolidated record for each call.

In a further aspect of the present invention there is provided a communication system comprising a plurality of logical exchanges each assigned a unique address point code, at least one of said logical exchanges being a sub-network containing a plurality of multi-service hubs interconnectable to one another through a broadband domain, each multi-service hub further coupled through communication resources to at least one of the remaining logical exchanges, each multi-service hub further being uniquely assigned a hidden point code different to any of the address point codes assigned to the logical exchanges, and wherein the hidden point codes: support interconnection of a first MSH to a second MSH through the broadband domain; and are inaccessible from a connection perspective from outside the sub-network.

The hidden point codes may be used to support management information, but are generally only used within the sub-network.

The communication system preferably further comprises means for converting between an address point code and a hidden point code.

The means for converting, which is coupled to the remaining logical exchanges, translates a first address point code of the sub-network into a first hidden point code associated with an MSH entry point into the sub-network and further translates a second hidden point code associated with an MSH exit point from the sub-network into the address point code in onward routing of signalling messages to a destination address associated with one of said remaining logical exchanges.

In a preferred embodiment, said means for converting comprises: a signal transfer point (STP) providing a signal routing function and accessible by the plurality of logical exchanges; and a signalling server 352 coupled to the STP, the signalling server further coupled to the broadband domain and arranged to logically interconnect each MSH and to provide a sub-network routing function for interworking on an intra-MSH basis.

In a particular embodiment, each multi-service hub is assigned at least one unique hidden point code different to any of the address point codes assigned to the logical exchanges.

The signalling server) typically has an associated memory that contains a point code mapping function between address point codes and hidden point codes. The functionality of the STP may be collocated with the signalling server.

In yet another aspect of the present invention there is provided a method of establishing a connection across an intermediate sub-network containing a plurality of multi-service hubs (interconnectable to one another through a broadband domain, each multi-service hub further coupled through communication resources to at least one logical exchange external to the sub-network, the method comprising the steps of: assigning individual address point codes to each logical exchange external to the sub-network and also to the sub-network; and uniquely assigning at least one hidden point code different to any of the address point codes assigned to the logical exchanges, to each multiservice hub, and wherein the hidden point codes are inaccessible from a connection perspective from outside the sub-network.

In a preferred embodiment, the method of establishing a connection across an intermediate sub-network further comprises the steps of: establishing a connection between a first logical exchange having a first address point code and a second logical exchange having a second address point code via a first MSH having a first hidden point code, a second MSH having a second hidden point code and the broadband domain, the step of establishing further comprising the step of: and converting between an address point code and a hidden point code upon entry into and exit from the sub-network.

In a preferred embodiment, the step of establishing further comprises the steps of: translating the address point code of the sub-network into the first hidden point code associated with an MSH entry point into the sub-network; and translating the second hidden point code associated with an MSH exit point from the sub-network into the second address point code associated with a destination address of the second logical exchange.

Most preferably, the method further comprising the steps of: providing a database that cross-references hidden point codes and point codes addresses; obtaining an indication of the MSH exit point from dialled digits emanating from the first logical exchange; determining the second hidden point code from the database; and providing a path between the MSH entry point and the MSH exit point.

In a further aspect of the present invention there is provided an intermediate element manager for a communication system comprising a plurality of multi-service hubs (MSH) each having an exchange with at least one multi-service platform (MSP), the exchange and the at least one MSP managed by an element manager that co-ordinates management thereof, the communication system further comprising an operations and support system (OSS) providing a control interface to an operator of the communication system, wherein: the intermediate element manager is arranged to be coupled to each element manager in each MSH and also to be coupled to the OSS, the intermediate element manager configured to intercept system management information passed between the OSS and each of the element managers such that the intermediate element manager provides a single address point to the OSS while also appearing to be an OSS to each element manager in each MSH and such that the intermediate element manager relays system management information between the OSS to each element manager.

Advantageously, the present invention provides a communication system with a uniform operational and signalling perspective whilst beneficially maintaining a distributed architecture that inherently supports system recovery from individual exchange failures. In other words, the distributed nature of a multi-MSH environment is hidden from a service provider, whilst the system is robust and able to support re-routing should any individual MSH suffers a temporary but fatal system failure. Consequently, an operator is provided with a single node view from the perspective of an operations layer, whilst each exchange perceives the intermediate element manager as a network manager and is therefore beneficially oblivious of other exchanges/MSHs within the communication system. Moreover, the preferred embodiment of the present invention supports a significant increase in system handling capacity whilst maintaining an underlying network architecture of existing narrowband systems. Furthermore, migration to a fully-fledged broadband (access) network is supported through relatively simply modification of system connectivity.

In relation to the term "MSH", this is described in detail in the subsequent text with specific reference being made to FIG. 1 and the typical exchange environment 50.

The improved system can beneficially be offered without having to change or enhance existing DMS™ and MSH security schemes.

BRIEF DESCRIPTION OF THE DRAWINGS

Exemplary embodiments of the present invention will now be described with reference to the accompanying drawings, in which.

DETAILED DESCRIPTION OF PREFERRED EMBODIMENTS

Figure 1:
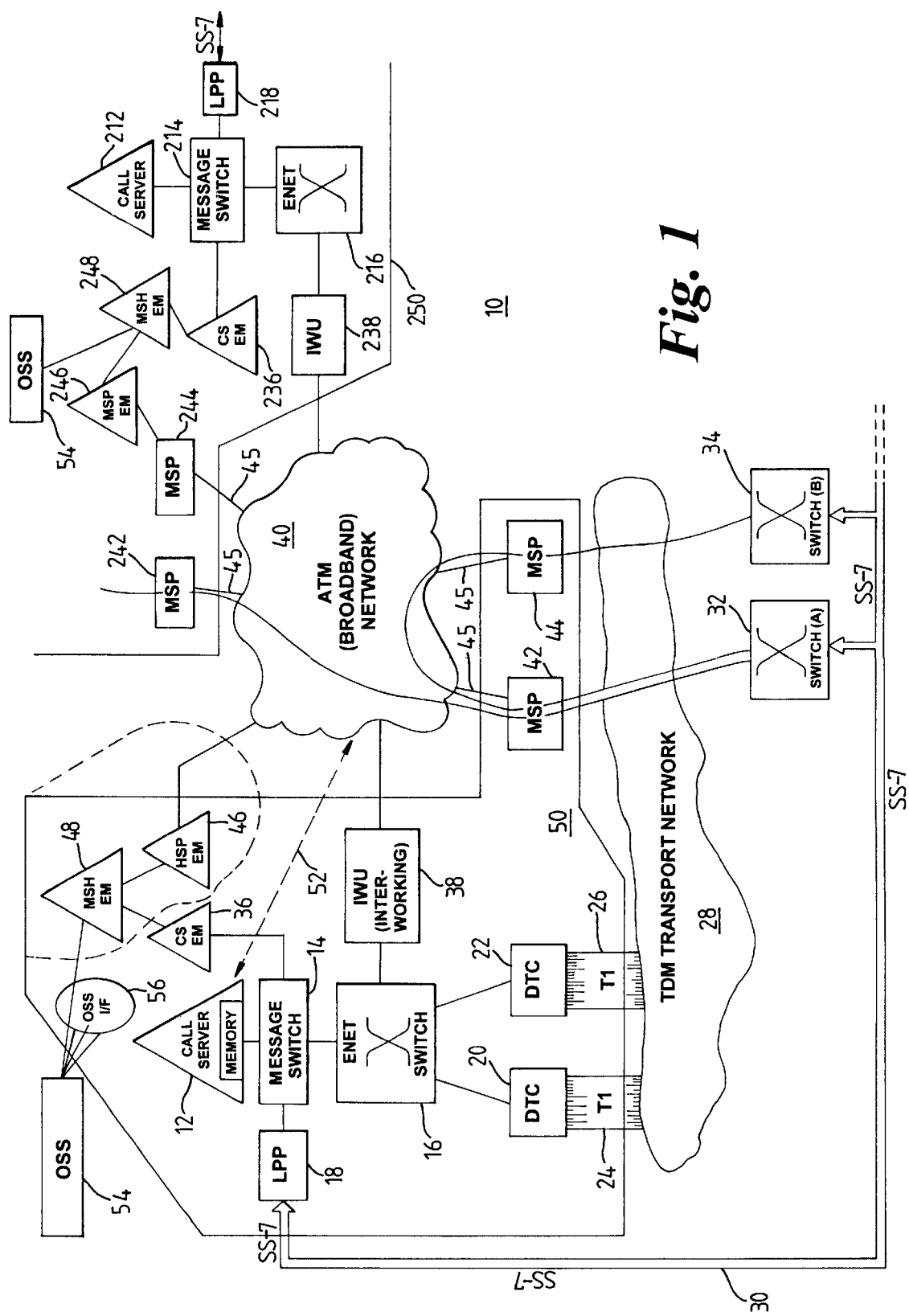
FIG. 1 is a block diagram of a portion of an enhanced narrowband-broadband communication system according to a preferred embodiment of a first aspect of the present invention.

To appreciate fully an architectural implementation of the present invention it is best initially to consider present narrowband system configurations, such as the DMS™ exchange, and then to extend the architecture to produce an enhanced narrowband-broadband communication system 10 as shown in FIG. 1.

A first exchange of the communication system 10 comprises a call server 12 coupled to a message switch 14. The call server 12, as will be understood, is a processing platform that is able to invoke feature codes and establish call connections, whereas the message switch 14 provides a lower level control interface to the call server. The message switch 14 acts to route signalling and control messages to an appropriate one of an ENET switch fabric 16 and a link peripheral processor (LPP) 18 that intercepts signalling messages. In this way, the call server can set up connections within the ENET switch fabric 16, with the ENET switch fabric 16 coupled to a plurality of peripherals, e.g. Digital Trunk Controllers (DTCs) 20–22. As will be understood, DTCs 20–22 provide terminations for individual circuits within trunks. In this respect, a plurality of T1 links 24–26 (each providing twenty-four circuits) couple each DTC 20–22 to a narrowband domain 28 employing, for example, time division multiplexing (TDM).

Control messages, typically supported using SS7, are routed along a dedicated signalling resource 30 and via link peripheral processors (LPPs) of different exchanges (represented by switch (A) 32 and switch (B) 34 within the communication system 10. In this way, signalling information is shared and disseminated within the communication system 10 to allow the setting up of multi-node calls. As will be understood, SS7 can reference circuits in a voice route either directly or indirectly.

The message switch 14 is further coupled to a call server element manager (CSEM) 36, such as a super-node data manager (CSEM), operationally responsive to the call server 12, and arranged to provide functionality such as switch configuration and connection monitoring (for alarm generation, for example); other functions will be readily appreciated.

Up to this point, the architecture is common with that found in the original DMS™ exchange manufactured by Northern Telecom Limited.

In order for the call server 12 to be able to draw on broadband resources, the ENET switch fabric 16 is further coupled to an interworking unit (IWU) 38 that facilitates broadband-narrowband connection. The IWU 38, which is managed by the call server 12, provides an interface to a broadband network 40 that uses, for example, ATM techniques for data transport.

Multi-service platforms (MSPs) 42–44 are coupled to the broadband network 40 through suitable interfaces 45. Although MSPs are generally accessed through the broadband network 40, they are also linked back directly into the narrowband domain and hence to other narrowband nodes 32–34. Each MSP is assigned to a specific call server. The MSP EM 46 manages the MSP platform and its physical interfaces whilst operational data concerning the MSP is sent to and stored by the assigned call server.

The architecture to this point is sometimes referred to as a "Mulit-Service Hub" or "MSH" since it extends the DMS™ exchange into a broadband, multiple service environment.

Operation of the MSPs 42–44 is managed by an MSP element manager (MSP EM) 46 that is coupled to an MSH element manager (MSH EM) 48 that pulls together all management aspects of the call server (and all lower level connected entities) and also the MSPs. Consequently, the CSEM 36 is also coupled to the MSH EM 48.

A logical exchange 50 can therefore be formed from all of the above. The narrowband system is actually comprised from the call server 12, the message switch 14, the ENET switch fabric 16, DTCs 20–22, the LPP 18 and the IWU 38.

With network development, it will be appreciated that the exchange 50 may be simplified and the narrowband equipment, namely the ENET switch fabric 16, the DTCs 20–22 and the IWU 38, omitted. In this case, a direct connection 52 (shown by the dotted arrow) is made between the call server 12 and the broadband network 40. LPP functionality is also moved into a signalling server coupled to call server over the broadband network.

The MSH EM 48 provides a single management point for one or more operations and support system (OSS) 54, with the OSS 54 coupled to the MSH EM 48 through an OSS interface 56.

By way of example, two connections are shown in FIG. 1, namely: i) switch (A) 32, i.e. a distantly located and separate exchange from that associated with the exchange 50, connects a first call to switch (B) 34 (associated with another narrowband exchange) via MSP 42, broadband network 40 and MSP 44; and ii) a second connection is coupled through the broadband network 40 from switch (A) to an MSP 242 in a different (second) exchange 250. A virtual path could be used to realise a connection of MSPs through the broadband network 40, with the path established by a technique such as phantom trunking, as described in PCT/GB98/02345.

Lower order digits pertaining to the reference numbering of the second exchange are consistent with that used in relation to the various system entities previously (and principally) described in relation to first exchange 50, although the reference numerals are in a "200 series", e.g. the call server of the second MSH or exchange is identified by reference numeral 212.

The general architecture of the second exchange 62 is ostensibly identical to that already described in relation to exchange 50, and by virtue of its interconnection to the ATM (broadband) domain the communication system therefore evolves into a multi-MSH configuration. Furthermore, the communication system 10 could, in fact, contain many additional exchanges that are again coupled to the broadband domain to increase the number of MSHs in the communication system 10. SS7 signalling between the numerous MSHs therefore ensures consistent operational performance and effective interoperation.

As will now be appreciated, the multi-MSH architecture of FIG. 1 provides an ability to process an increased number of BHCAs whilst supporting end-to-end calls through a broadband network, although the system is distributed and contains a plurality of control interfaces to the OSS 54. Indeed, the increased capacity is provided by virtue of the multi-call server configuration, with each call server able to support a finite number of MSPs and BHCAs through them.

Figure 2:
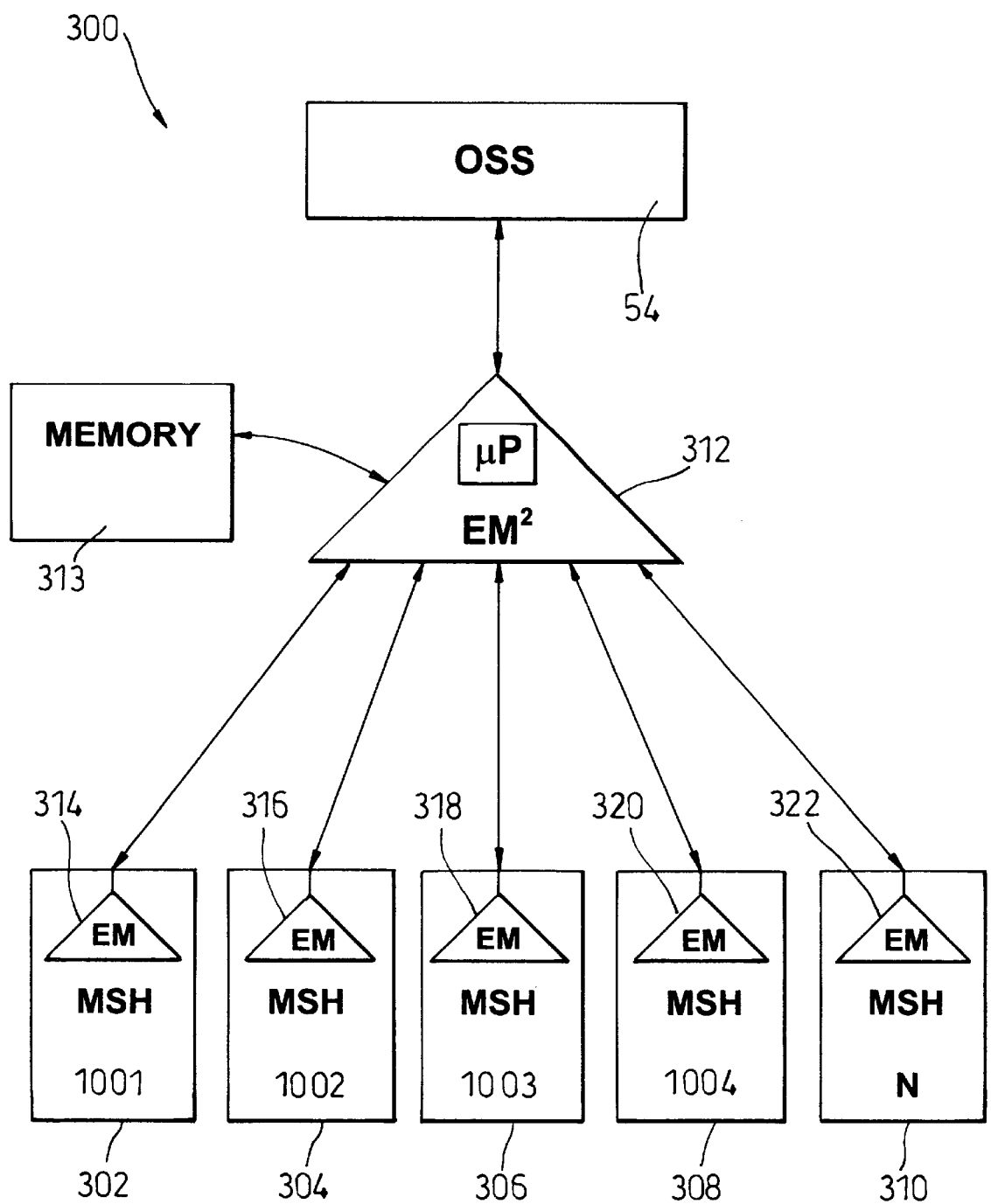
FIG. 2 is a block diagram a hierarchical system configuration of a multi-MSH environment according to a preferred embodiment of the present invention.

Reference is now made to FIG. 2 that shows a block diagram 300 of a hierarchical system configuration in a multi-MSH environment according to a preferred embodiment of the present invention. Basically, an OSS 54 has a single node view with respect to individual MSHs 302–310, which single node view is obtained by virtue of the provisioning of an intermediate MSH element manager (EM$^2$) 312 located between the OSS 54 and the plurality of MSHs 302–310. The intermediate EM$^2$ 312 (which has an associated memory 313) is then coupled to each individual MSH element manager 314–322 of each MSH 302–310, with the individual MSH EMs functionally corresponding to that of the MSH EM 48 of FIG. 1.

The OSS 54 is therefore able to address the intermediate EM$^2$ 312 as though the OSS were merely connected to a solitary MSH, and so signalling, interfacing and operational control from the OSS 54 is consistent with existing techniques. The intermediate EM$^2$ is configured (in a downlink sense) to strip-out system addressing and route to individual MSHs (to be described subsequently) through the use of mapping tables stored in its associated memory 313.

A second purpose of the intermediate EM$^2$ 312 is to provide a single node reporting point (analogous to the OSS 54) to lower level MSH EMs 314–322. Consequently, the intermediate EM$^2$ acts to consolidate signalling from the individual MSH EMs to the OSS 54. In this dual role, the intermediate EM$^2$ ensures that the OSS 54 only receives management information and the like from a single node, and preferably in a format already used to express information between a solitary MSH and the OSS 54. Consequently, the intermediate EM$^2$ can ensure that the format of information transfer is optimised for receipt by the OSS 54 (taking into account the numerous sources of management information incident to the intermediate EM$^2$ from the individual MSH EMs 314–322), which process may also involve a protocol translation at the intermediate EM$^2$ (if required). Preferably, log records from call servers and MSPs are consolidated onto a single flow and identify affected/failed components by name and/or location. If necessary, the intermediate EM$^2$ can queue management information and the like in its memory 313 for subsequent re-packaging of information into blocks of related data and hence reduced overhead to the OSS and more efficient data transfer, generally. In a similar fashion, the EM$^2$ can consolidate performance measures from the call servers and MSPs, with the performance measures typically reflecting traffic flows, billing information and semi-permanent virtual channel set-up rates, for example. The EM$^2$ is therefore a logical device realised in a processor-based 323 architecture.

The intermediate EM$^2$ also acts to strip-out superfluous data (otherwise destined for the OSS 54) from messages communicated to it by the lower level MSH EMs 314–322, and further acts to translate artificial but assigned MSH addresses into system-wide addresses understandable by the OSS 54; the underlying mechanism and purpose will become apparent later.

Figure 3:
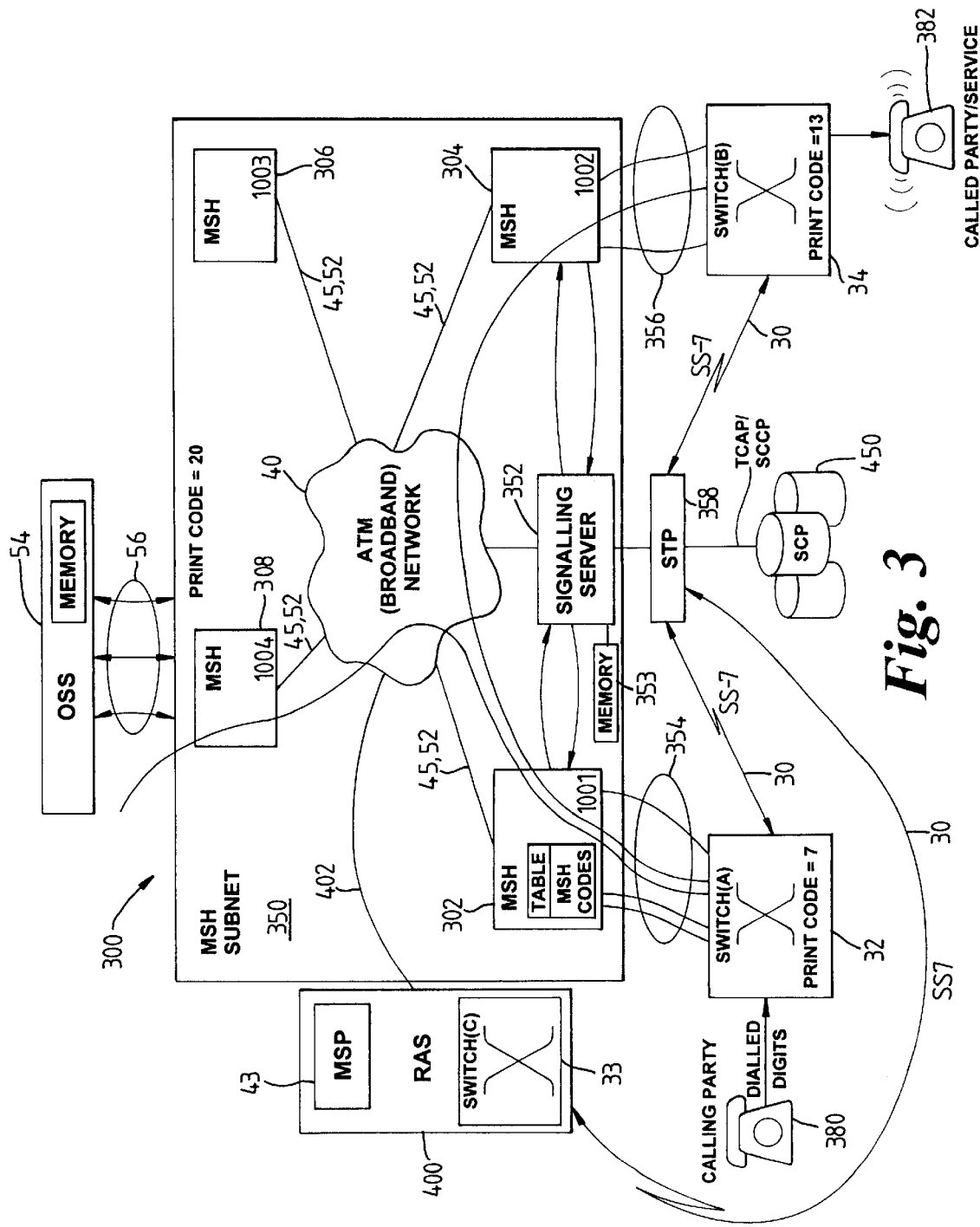
FIG. 3 is a block diagram of an overall communication system architecture and interconnection mechanism of a preferred embodiment of the present invention.

Turning attention to FIG. 3, a block diagram of an overall communication system architecture 300 and interconnection mechanism of a preferred embodiment of the present invention is shown. The intermediate EM$^2$ 312 that has overall interface control between the OSS 54 and individual MSH EMs has been omitted for the sake of clarity. Similarly, the individual MSH EMs 314–322 have been omitted.

In relation to the system architecture 300, an MSH sub-net 350 is based about a plurality of MSHs 302–308 that are interconnected through a broadband network 40. The MSH sub-net 350 further includes a signalling server 352 that is coupled to the broadband network 40 and which logically interconnects each MSH 302–308. The signalling server 352 (which is typically realised as a set of control processors) has an associated memory 353 that contains a point code mapping function. The signalling server 352 acts to provide an intrinsic MSH sub-net routing function and necessary protocol translation (accessible in terms of a memory retrieval function) for interworking on an intra-MSH basis. As previously indicated, each MSH 302–308 is connected to the broadband network 40 through an interface 45 to an MSP (not shown). Optionally, the connection is via the IWU or direct from the call server via a direct broadband connection 52.

External to the MSH sub-net, a plurality of additional exchanges 32–34 (which may only support narrowband traffic, although they could equally well be mixed nodes (such as other MSH sub-nets) or entirely broadband based) interconnect to individual MSHs 302–308 through real trunks, real circuits and hence real voice paths/routes 354–356. The plurality of additional exchanges 32–34 communicate to a signal transfer point (STP) 358 using a control protocol, such as SS7. The STP 358 provides a signal routing function, and is further coupled to the signalling server 352.

The STP is accessible on a system-wide basis from all nodes within the communication system 300. Optionally, the STP function could reside within the signalling server, but the logical picture remains the same. Indeed, the SS7 network configuration, signalling and routing is greatly simplified through consolidation of the signalling server and STP.

To ensure system survivability, a preferred embodiment contains at least geographically separate signalling servers (and associated STP functionality); one generally acting in a standby capacity.

Each MSH sub-net 350 is assigned a unique point code address within the narrowband network that acts in an address capacity. Each MSH within the sub-net also has a unique but hidden point code that is only accessible on a MSH sub-net level, but not at an inter-exchange level. In fact, the MSH point codes are selected from a mutually exclusive set of hidden point codes that do not coincide or overlap with the address point codes assigned at an exchange level. For example, MSHs within the MSH sub-net 350 are assigned hidden point codes 1001–1004, whereas the MSH sub-net (and particularly its point of entry realised by its dedicated signalling server 352) may have a point code 20 visible on a system-wide basis via the STP 358 and OSS 54. Other nodes will have similar (but not identical) codes to the MSH sub-net 350, e.g. the node associated with switch (A) may be referenced as point code 7, whereas the node associated with switch (B) may be point code 13.

Routing of a call through the MSH sub-net 350 is restricted (for optimised operation) to a passage through a maximum of two MSHs, since an appropriate selection of any two MSHs defines all points of entry and all points of exit in relation to the MSH sub-net 350. Clearly, routing between MSHs occurs through phantom trunks realised by virtual channels in the broadband domain.

In operation, the signalling server 352 traps messages from the STP 358 and then refers to its memory 353 to both interpret the message and then to translate (in the sense of transposing the point code) and finally route the message to a specific MSH within the MSH sub-net. In other words, a set-up message sent from an external node, such as another exchange or switch, to the MSH sub-net 350 as point code 20 must be interpreted by the signalling server as "message from external node (point code y), address to hidden point code 1 XXX of internal MSH".

In more detail, a connection is set-up through the use of SS7 signalling to the STP 358, with the originating node sending a message in the exemplary form of: point code of initiating node (FROM XX), circuit identity code associated with data part of message (CIC #), point code of addressed node (TO YY). For example, in addressing an Internet server (MSP) associated with MSH 302 (having hidden point code 1002) of MSH sub-net 350 from a switch 32, the message to the STP 358 would initially therefore be (FROM 7, CIC #, TO 20). The STP 358 would therefore address the signalling server 352 associated with MSH sub-net 350.

Since the signalling server 352 is aware (by virtual of its pre-provisioned table of point codes, i.e. its point code mapping function) of the external nodes serviceable from a particular MSH, the signalling server 352 can translate (FROM 7, CIC #, TO 20) to (FROM 7, CIC #, TO 1001) in order to take into account the hidden point code and the MSH that is actual addressed. The connection between external node 7 and MSH 1001 can therefore be set-up.

Since the MSH sub-net represents an intermediate portion of a connection path or route, dialled digits in the call signalling message from, for example, a calling subscriber terminal 380 will identify the end point and hence the unique call server (and MSH) dedicated to handle the voice route/ data connection to an associated exchange assigned to a called party/service 382. Each call server can store in associated memory a dial tree, a map of notional destinations and a routing plan in which case the call server of the initially addressed MSH initially refers to its dial tree to identify the succeeding call server in the MSH sub-net and then selects an appropriate routing plan. Once the routing plan has been determined, establishment of the virtual path through the broadband network 40 can be made.

In relation to the exemplary connection (FROM 7, CIC #, TO 1001), the dialled digits may, when interpreted, identify external node switch (B) 34 having an address point code 13. Consequently, the call server of the initially addressed MSH references its memory to establish an identity of a second call server associated with an exit point from the MSH sub-net. An information connection is then established (as orchestrated by the respective call servers) between the MSHs in the path of the connection in order that the second call server can subsequently establish the requisite outbound connection from the MSH subnet; this is entirely transparent at the operations level of the OSS. Specifically, by virtue of the dial tree and routing plan, the call server of the initially addressed MSH identifies MSH 304 (having hidden point code 1002) as the exit point from the MSH sub-net 350 in relation to the dialled digits. In other words, MSH 304 (having hidden point code 1002) is always associated with a particular external node or set of external nodes, and so if it is addressed on an intra MSH sub-net basis then it must act to establish an external connection to the external node identified by the dialled digits.

Once the second call server (of MSH 304 having hidden point code 1002) is aware of the requirement for establishment of a connection and especially that a path must be provided out from the MSH sub-net 350 to the external node identified by the dialled digits, the call server of MSH 304 effectively contacts the signalling server 352 which then both associates the connection between the MSH (by virtue of the CIC, for example) and the external exchange and translates the hidden point code 1002 to the point code of the MSH sub-net, i.e. address point code 20. The signalling server 352 is then able to send a translated SS7 message identifying the MSH sub-net as an intermediate connection node to the external node identified in the dialled digits. More specifically, the signalling server 352 will operate through the STP 358 that will effectively provide SS7 control signalling to the external node via the dedicated signalling resource 30.

Consequently, a connection has been established through the MSH sub-net 350 using hidden point codes, although these hidden point code are only observable within the internal signalling of the MSH sub-net. In all other respects, the end-to-end connection from a first external node via the MSH sub-net 350 to a second external node merely refers to the MSH sub-net as a single entity having a single address point code, with the signalling server 352 effectively disguising the lower level detail of the distributed MSH architecture within the MSH sub-net 350.

In relation to the broadband network, busy routes may have pre-assigned capacity (although this is clearly an arbitrary design choice).

As will now be realised, routing and call server association information (such as which call server is associated with which external node and which specific circuit) is pre-assigned and stored. Indeed, the information required to establish intra-MSH sub-net connections between MSHs may initially reside in the intermediate $EM^2$ 312 and may therefore be downloaded at system start-up or system up-grade either to a particular MSH call server via its associated MSH EM or on an MSH-wide basis, coordinated with download to the signalling server 352. Moreover, with such pre-stored configuration and connection information, disaster recovery occurring with MSH failure may be overcome through selective downloading from the intermediate $EM^2$ to at least one of a standby (and hence otherwise redundant) MSH or an on-line MSH with additional processing/servicing capabilities. Preferably, routing and management information pertaining to a call server/MSH is stored in and utilised by the MSH EM, with the stored information including an indication as to the services offered by individual call servers.

In relation to disaster recovery, following download to a spare call server, the spare call server (at start-up) interrogates its voice routes using such techniques as ISUP maintenance messages to determine trunk busy/free status, and then releases any remaining trunks without call records after expiry of a predetermined time-out. Total outage of an MSP is limited by load-sharing each voice route from an external exchange across those MSPs which have been allocated to the MSH that terminates that particular voice route; this results in reduced capacity by no total loss of service.

The $EM^2$ 312 therefore contains information pertaining to internal, i.e. hidden, point codes associated with each MSH with the MSH sub-net, together with associated dial trees, routing plans, assigned CICs and related external node addresses. Of course, during system operation, such information may be up-dated, and is always accessible from the OSS for system control. Indeed, it is contemplated that the system operates with time-of-day variations in which there is dynamically controlled routing to track and update traffic patterns. Clearly, such dynamic control would lead to corresponding changes in routing tables, e.g. the preferred exit points from the MSH sub-net to ultimate destinations may change.

In relation to CICs, even though phantom trunks (as described in PCT/GB98/02345) support a broadband connection between MSHs of the MSH sub-net 350, it is preferred that ranges of CICs are pre-assigned with respect to specific interfaces between MSHs and their respectively associated external nodes; this ensures that the signalling server is always able to identify the MSH end points within the MSH sub-net. Of course, the present invention also contemplates that there can be pre-allocation of resources (e.g. pre-configured virtual paths or circuits) on very busy routes between MSHs of the MSH sub-net 350.

Having now appreciated both the use of hidden point codes to present the MSH sub-net as a single switch and the modified architecture employed to provide uniform management functions, it is appropriate now to expand on the management aspects of the MSH sub-Net configuration.

Having implemented an intermediately located $EM^2$ between multiple conventional MSHs and the OSS 54, network billing may involve merging of billing streams from individual call servers at the intermediate $EM^2$ level. Alternatively, billing records could be sent via the intermediate $EM^2$ from individual call servers, with the hidden point code either translated into that of the MSH sub-net address point code, or retained to differentiate a billing area, e.g. a higher call-charge rate for central Manhattan as opposed to an area in the vicinity of the far east of Long Island. Furthermore, the intermediate $EM^2$ can function to correlate billing records from the two call managers involved in a call across the MSH sub-net 350 and therefore to provide a single consolidated record for each call.

In summary, a first aspect of the present invention (FIG. 2) provides a sub-net management layer with applications that hide the details of individual MSH nodes from the higher-level OSS operations system; this is realised by the intermediate $EM^2$ 312. Functionality provided to the intermediate $EM^2$ includes that required to: configure the MSH sub-net; install and configure both call servers, access boxes (i.e. MSPs) and voice routes; define and map community of interest information pertaining to traffic capacity requirements between external nodes onto provisioned internal phantom trunk groups; manage time of day traffic variations; and manage the flow of information back to the OSS (e.g. by consolidating logs, performance data and call records from individual MSHs).

In summary of the second aspect of the present invention, SS7 signalling is consolidated into a unique externally visible point code, whereby a robust and scalable signalling server is configured to convert between a single point code (indicative of the MSH sub-net as a single switch) and internal point codes assigned on a unique basis to each MSH node.

The system operator therefore perceives the MSH sub-net 350 as a single exchange in which switching occurs between external TDM voice routes (in a hybrid narrowband-MSH sub-net configuration).

It will, of course, be appreciated that the above description has been given by way of example only and that modifications in detail may be made within the scope of the present inventions. For example, while the preferred embodiment describes an MSH as having a hidden point code, it is more likely that the associated call server will actually be assigned the hidden point code, with this being effectively stored in its associated memory. Additionally, while the broadband network preferably supports ATM, other broadband transmission schemes are readily substitutable therefor. Furthermore, the underlying concept of the use of hidden point codes to support a distributed system that appears an a unitary system is clearly not restricted to the specific exchange architecture described as the preferred embodiment, and so can be applied equally to other telecommunication systems. Equally, the concept that an intermediate element manager acts both to unify reporting channels whilst also distributing control information from an OSS is applicable to other communication networks, since the intermediate element manager (in essence) maintains existing information flows between an operations and system management level of a communication system and lower level network equipment concerned principally with actual path and route establishment. Moreover, the intermediate element manager supports and growth and development of an existing system whilst maintaining an established signalling and control protocol.

Figure 4:
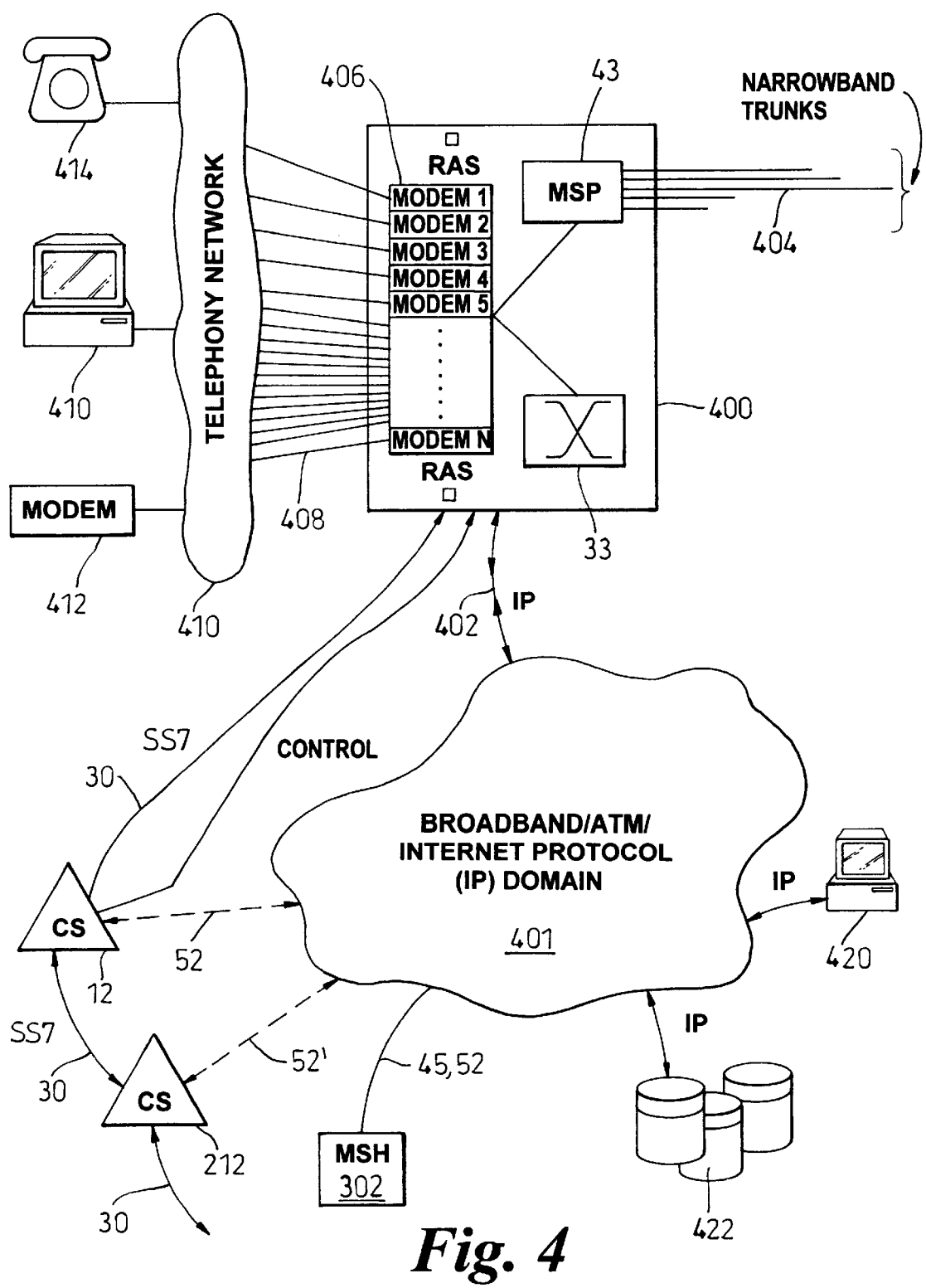
FIG. 4 is block diagram illustrates a further embodiment of the underlying inventive concept as employed within an Internet protocol (IP) environment.

With regard to a typical implementation of the underlying principles of the present invention to an Internet protocol (IP) environment, reference is made FIG. 4. In a similar way to the MSHs of FIG. 3, a remote access server (RAS) 400 is provided with a unique point code since it acts in an analogous fashion to a logical exchange and therefore can be addressed as a single entity. The RAS 400 typically includes a switch 33 and a MSP 43; these may be collocated. The RAS is coupled to broadband/ATM/Internet Protocol (IP) domain 401 through an IP communication resource 402, while the MSP 43 also interfaces to a plurality of narrowband trunks 404. The RAS 400 also includes a bank of modems 406 that can be dynamically assigned to one of a number of different communication channels, typically supported on communication resources 408 of a telephony-type network 410. The communication resources may be wireline resources such as optical fibres, copper pairs or the like, although the communication resources could also be realised in a radio frequency environment. Generally, however, the communication resources 408 ultimately interconnect to dedicated subscriber equipment, such as a computer 410, a modem 412 or a suitably configured telephone device 414.

The RAS 400 (which is also shown in FIG. 3) is further coupled to call servers 12 and 212 associated with the general system configuration through at least one common signalling channel supporting SS7. The call servers are themselves coupled to the broadband/ATM/Internet Protocol (IP) domain 401 through suitable (and preferably broadband) interfaces 52, 52' that support the Internet protocol (or its functional equivalent). IP will also be used to provide a communication protocol to interface the broadband/ATM/Internet Protocol (IP) domain 401 with an Internet service provider 420 or other data repository 422 (or the like).

In relation to the establishment of an IP-based communication between, say, computer 410 and Internet service provider 420, the computer initially exercises a dial-up scheme (such as IP access in Internet telephony) to the RAS 400. The RAS 400 immediately selects and assigns an available modem to the call from its bank of modems 406. The RAS 400 then effectively signals a call server associated with the Internet service provider 420; this is achieved through the use of the signalling server 352 that functions in accordance with the connection strategy already detailed above and specifically in relation to FIG. 3. The signalling server and its associated STP 358 have been omitted from FIG. 4 for the purposes of clarity, although it will clearly be appreciated that the signalling server and STP function to intercept, interpret and forward signalling control messages between logical exchanges, call servers and MSHs. The signalling server therefore passes off relevant messages to an identified call server.

Once the identified call server is in receipt of the message from the signalling server it becomes aware of the existence of a connection requirement. The identified call server, through the use of a control channel and associated signalling scheme (e.g. MGCP), is configured to notify the RAS 400 that it can, in fact, directly route IP and hence establish a point-to-point IP communication between the computer 410 and Internet service provider 420 via the broadband/ATM/Internet Protocol (IP) domain 401. Consequently, the RAS 400 is able to release (i.e. drop) the modem that was initially required to establish connection from the computer 410 to the RAS, which modem is therefore freed for contemporaneous use in another call or connection event.

The underlying inventive concept of the present invention, such as exemplified in FIG. 3, can be enhanced through the assignment of multiple unique point codes to the MSH subnet 350, with each MSH 302–308 also potentially having more than one point code (although multiple point codes assigned to MSHs will only be visible within the confines of the MSH subnet 350). In other words, the MSH subnet 350 can present more than one point code to the rest of the communication network or system; this is advantageous in relation to the presentation of multiple virtual nodes that can be used, for example, in an international exchange that straddles a plurality of country boundaries. Indeed, the MSH subnet 350 may therefore appear in more than one network simultaneously and even to the extent that it has a different network indicator and it uses a different protocol (e.g. ITU as opposed to ANSI). Although each MSH now has at least one point code assigned to it, any one of the collection of all the assigned point codes within the MSH subnet still uniquely identifies the MSH subnet 350. The use of multiple assigned point codes can also be used to increase SS7 signalling capacity by permitting the implementation of parallel linksets between the signalling server 352 and the STP 358 where call processing is partitioned between virtual nodes within the MSH subnet 350.

A further modification of the underlying inventive system configuration of the present invention may be made, as demonstrated in FIG. 3. Specifically, in order to support TCAP/SCCP over SS7 (as opposed to ISUP over SS7 that has been envisaged as the most typical form of control information), a service control point (SCP) 450 is coupled through a control interface to the STP 358. Generally, TCAP/SCCP over SS7 is a protocol used in relation to queries generated between MSHs 302–308 and databases or data repositories, and when exchanges 32–34 query the MSH subnet 350. Basically, in relation to TCAP/SCCP over SS7, there is a similar routing strategy in the MSH subnet 350, although routing involves a slightly different level of detail. Of course, signalling between the logical exchanges could also use TCAP/SCCP and so the signalling resource 30 would be configured accordingly.

For incoming queries, the handling of TCAP/SCCP over SS7 may be sub-system specific. For those sub-systems where the data is local to a particular MSH 302–308 internal to the MSH subnet 350 (such as in relation to certain CLASS services associated with particular directory numbers), the TCAP message is decoded by the signalling server function and the directory number extracted for use as an index into the point code mapping function. Of course, sub-system handling could, in some cases and as desired, be completely handled in the signalling server 352; this occurs when the data or function (such as a routing verification test) is common to all MSHs 302–308 within the MSH subnet 350. For queries originating form an MSH 302–308 within the MSH sub-net 350, a response must generally be returned to the originating MSH. Consequently, the TCAP message is augmented by suitable mapping information, such as a transaction identify ("TRID") mapping function, to facilitate routing of the return message of information.

While the preferred embodiment details a specific North American narrowband-broadband system, it should be readily appreciated to one versed in the art that the architecture may be adapted for other international systems without significant impact to the present invention. For example, in Europe, signalling messages are generally carried in El trunks and so SS7 messages would reach the signalling server via a different route avoiding the STP 358; although this makes no difference to functional operation. Indeed, the fundamental concepts of the present invention are independent of the internal design details of narrowband exchanges.

What is claimed is:

1. A communication system comprising:
   a plurality of multi-service hubs (MSH), each MSH comprising an exchange having at least one multi-service platform (MSP), the exchange and the at least one MSP managed by an element manager that co-ordinates management thereof;
   an operations and support system (OSS) providing a control interface to an operator of the communication system; and an intermediate element manager coupled to each element manager in each MSH, the intermediate element manager further coupled to the OSS and configured to intercept system management information passed between the OSS and each of the element managers such that the intermediate element manager provides a single address point to the OSS while also appearing to be an OSS to each element manager in each MSH.

2. The communication system of claim 1, wherein the intermediate element manager comprises:

a memory containing a connection map; and means, coupled to the connection memory, for stripping-out system addressing incident to the intermediate element manager from the OSS and for routing system management information to individual MSHs through use of the connection map.

3. The communication system of claim 1, wherein the intermediate element manager comprises:

means of consolidating information from each element manager in each MSH to the OSS, thereby ensuring that the OSS receives system management information from a single node only.

4. The communication system of claim 3, wherein each of the plurality of MSHs contains an associated call server, and the means of consolidating information consolidates, onto a single flow, at least one of:

log records from call servers and MSPs; and performance measures from the call servers and MSPs, said the performance measures typically reflecting traffic flows, billing information and semi-permanent virtual channel set-up rates.

5. The communication system of claim 4, wherein the means for consolidating information further includes means for identifying affected/failed system entities by at least one of name and location.

6. The communication system of claim 1, the intermediate element manager further comprising means for queuing system management information and means for re-packaging said system management information into blocks of related data.

7. The communication system of claim 1, wherein the intermediate element manager is configured to strip-out superfluous data from messages communicated to it by the each of the element managers.

8. The communication system of claim 1, wherein the intermediate element manager further comprises means for translating artificial but assigned MSH addresses into system-wide addresses understandable by the OSS.

9. The communication system of claim 1, wherein the intermediate element manager further comprises means for performing additional management functionality.

10. The communication system of claim 9, wherein the intermediate element manager further comprises means for merging billing streams emanating from each MSH (314–322) to produce a network billing record.

11. The communication system of claim 4, wherein in the intermediate element manager further comprises means for correlating billing records from a plurality of call managers involved in a call across the communication system, thereby providing a single consolidated record for each call.

12. A method of managing a communication system comprising a plurality of multi-service hubs (MSH) each having an exchange with at least one multi-service platform (MSP), the exchange and the at least one MSP managed by an element manager that co-ordinates management thereof, the communication system further comprising an operations and support system (OSS) providing a control interface to an operator of the communication system and an intermediate element manager interconnecting each element manager in each MSH and the OSS, the method comprising:

restricting a passage of system management information between the OSS and selected ones of the plurality of element managers to a path via the intermediate network manager, such that the intermediate element manager provides a single address point to the OSS while also appearing to be an OSS to each element manager in each MSH.

13. The method of managing a communication system according to claim 12, the intermediate element manager comprises a memory containing a connection map, the method further comprising:

stripping-out system addressing incident to the intermediate element manager from the OSS; and routing system management information to individual MSHs through use of the connection map.

14. The method of managing a communication system according to claim 13, further comprising:

in the intermediate element manager, consolidating information from each element manager in each MSH to the OSS, thereby to ensure that the OSS receives system management information from a single node only.

15. The method of managing a communication system according to claim 14, wherein each of the plurality of MSHs contains an associated call server, and the method of consolidating consolidates, onto a single flow, at least one of:

log records from call servers and MSPs; and performance measures from the call servers and MSPs, said the performance measures typically reflecting traffic flows, billing information and semi-permanent virtual channel set-up rates.

16. The method of managing a communication system according to claim 14, wherein the consolidating information further includes identifying affected/failed system entities by at least one of name and location.

17. The method of managing a communication system according to claim 12, further comprising:

at the intermediate element manager, queuing system management information; and re-packaging said system management information into blocks of related data.

18. The method of managing a communication system according to claim 12, further comprising:

at the intermediate element manager, stripping-out superfluous data from messages communicated to it by the each of the element managers.

19. The method of managing a communication system according to claim 12, further comprising:

at the intermediate element manager, translating artificial but assigned MSH addresses into system-wide addresses understandable by the OSS.

20. The method of managing a communication system according to claim 12, further comprising:

at the intermediate element manager, merging billing streams emanating from each MSH to produce a network billing record.

21. The method of managing a communication system according to claim 14, further comprising:

at the intermediate element manager, correlating billing records from a plurality of call managers involved in a call across the communication system, thereby providing a single consolidated record for each call.

22. The method of managing a communication system according to claim 14, further comprising:

associating a unique hidden point code with each of the plurality of multiservice service hubs (MSH); and one of the steps of:

translating unique hidden point codes into an MSH subnet address point code; and communicating an indication of the hidden point codes to indicate to the OSS a relative billing level between different geographic areas serviced by different MSHs having different hidden point codes.

23. An intermediate element manager for a communication system comprising a plurality of multi-service hubs (MSH) each having an exchange with at least one multiservice platform (MSP), the exchange and the at least one MSP managed by an element manager that co-ordinates management thereof, the communication system further comprising an operations and support system (OSS) providing a control interface to an operator of the communication system, wherein:

the intermediate element manager is arranged to be coupled to each element manager in each MSH and also to be coupled to the OSS, the intermediate element manager configured to intercept system management information passed between the OSS and each of the element managers such that the intermediate element manager provides a single address point to the OSS while also appearing to be an OSS to each element manager in each MSH and such that the intermediate element manager relays system management information between the OSS to each element manager.

24. The intermediate element manager according to claim 23, further comprising:

a memory containing a connection map; and means, coupled to the connection memory, for stripping-out system addressing incident to the intermediate element manager from the OSS and for routing system management information to individual MSHs through use of the connection map.

25. The intermediate element manager according to claim 23, further comprising:

means of consolidating information from each element manager in each MSH to the OSS 54, thereby ensuring that the OSS 54 receives system management information from a single node only.

26. The intermediate element manager according to claim 23, wherein each of the plurality of MSHs contains an associated call server, and the means of consolidating information consolidates, onto a single flow, at least one of:

log records from call servers and MSPs; and performance measures from the call servers and MSPs, said the performance measures typically reflecting traffic flows, billing information and semi-permanent virtual channel set-up rates.

27. The intermediate element manager according to claim 25, wherein the means for consolidating information further includes means for identifying affected/failed system entities by at least one of name and location.

28. The intermediate element manager according to claim 23, further comprising means for queuing system management information and means for re-packaging said system management information into blocks of related data.

29. The intermediate element manager according to claim 23, wherein the intermediate element manager is configured to strip-out superfluous data from messages communicated to it by the each of the element managers.

30. The intermediate element manager according to claim 23, further comprising means for translating artificial but assigned MSH addresses into system-wide addresses understandable by the OSS 54.

31. The intermediate element manager according to claim 23, further comprising means for performing additional management functionality.

32. The intermediate element manager according to claim 23, further comprising means for merging billing streams emanating from each MSH (314–322) to produce a network billing record.

33. The intermediate element manager according to claim 26, further comprising means for correlating billing records from a plurality of call managers involved in a call across the communication system, thereby providing a single consolidated record for each call.

\* \* \* \* \*